(12) United States Patent
Bernhardt et al.

(10) Patent No.: US 8,347,976 B2
(45) Date of Patent: Jan. 8, 2013

(54) HITCH DEVICE FOR A WORKING VEHICLE

(75) Inventors: Gerd Bernhardt, Haenichen (DE); Sergiy Fedotov, Dresden (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 359 days.

(21) Appl. No.: 12/235,206

(22) Filed: Sep. 22, 2008

(65) Prior Publication Data

US 2009/0084566 A1   Apr. 2, 2009

(30) Foreign Application Priority Data

Sep. 28, 2007   (DE) .......................... 10 2007 046 890

(51) Int. Cl.
 *A01B 59/06*   (2006.01)
(52) U.S. Cl. ...................................................... 172/444
(58) Field of Classification Search .................. 172/439, 172/444
 See application file for complete search history.

(56) References Cited

U.S. PATENT DOCUMENTS

| | | | | | |
|---|---|---|---|---|---|
| 2,555,987 | A | * | 6/1951 | Nelson | 172/439 |
| 3,432,184 | A | * | 3/1969 | Tweedy | 172/272 |
| 4,216,975 | A | * | 8/1980 | Schafer | 172/439 |
| 4,265,464 | A | * | 5/1981 | Lange | 172/450 |
| 6,196,327 | B1 | * | 3/2001 | Patel et al. | 172/7 |
| 6,321,851 | B1 | * | 11/2001 | Weiss et al. | 172/444 |
| 6,443,236 | B2 | * | 9/2002 | Staude | 172/439 |
| 6,708,631 | B1 | * | 3/2004 | McQuinn et al. | 111/174 |
| 6,830,110 | B2 | * | 12/2004 | Schlesser et al. | 172/8 |
| 7,008,168 | B2 | * | 3/2006 | Bernhardt et al. | 414/703 |
| 7,048,071 | B1 | * | 5/2006 | Huenink et al. | 172/439 |
| 7,073,603 | B2 | * | 7/2006 | Nordhoff | 172/272 |
| 7,353,885 | B2 | * | 4/2008 | Nordhoff | 172/272 |
| 2003/0217852 | A1 | * | 11/2003 | Bernhardt et al. | 172/200 |

FOREIGN PATENT DOCUMENTS

WO   2004/056168   7/2004

* cited by examiner

*Primary Examiner* — Thomas B Will
*Assistant Examiner* — Joel F. Mitchell
(74) *Attorney, Agent, or Firm* — Michael J. Striker

(57) ABSTRACT

A hitch device for a working vehicle for coupling a working device to the working vehicle has a lifting shaft unit supported in the frame structure of the working vehicle, and a coupling structure that is operatively connected therewith. The lifting shaft unit includes a lifting shaft, at least one lifting arm that is fixedly connected with the lifting shaft, and at least one reciprocating cylinder, which is hingedly connected with the lifting arm. The coupling structure includes first, upper coupling elements, which are located on the frame structure, second, lower coupling elements, which are hingedly connected to the frame structure, and connecting elements that are hingedly located on lifting arms of the lifting shaft. At least one of the connecting elements is rigid. In this manner, it is ensured that the load on the coupling elements that form the hitch device is balanced, even when a load is introduced asymmetrically.

28 Claims, 6 Drawing Sheets

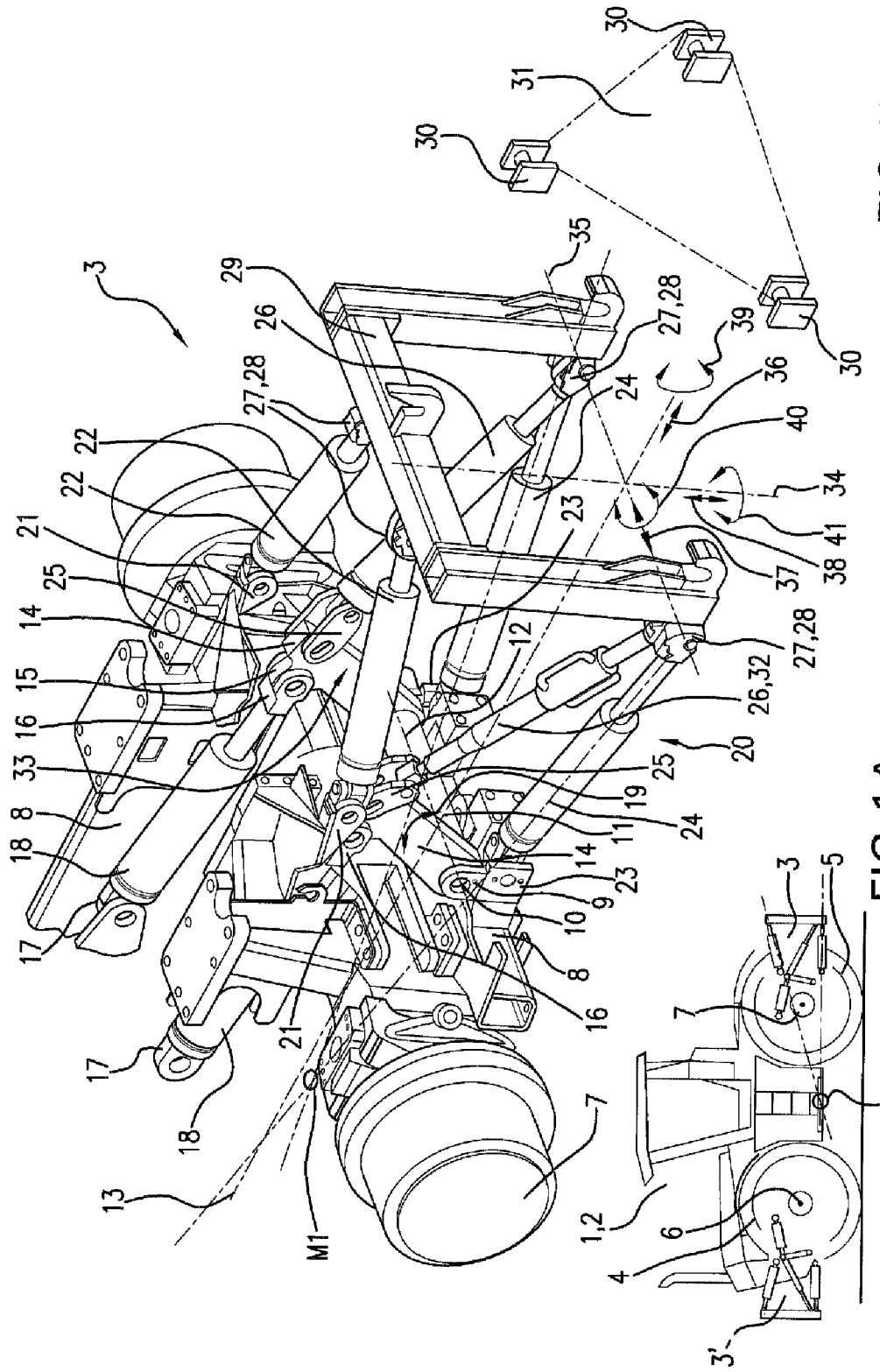

HITCH DEVICE FOR A WORKING VEHICLE

CROSS-REFERENCE TO RELATED APPLICATION

The invention described and claimed hereinbelow is also described in German Patent Applications DE 10 2007 046 890.5 filed on Sep. 28, 2007. This German Patent Application, whose subject matter is incorporated here by reference, provides the basis for a claim of priority of invention under 35 U.S.C. 119(a)-(d).

BACKGROUND OF THE INVENTION

The present invention relates to a hitch device for a working vehicle.

Publication WO 2004/056168 makes known a hitch device for a working vehicle designed as a tractor, the coupling structure of which is supported at the top on a frame structure of the tractor via an upper lifting shaft. The lifting shaft is coupled with two reciprocating cylinders that are hingedly located on the frame structure of the tractor via lifting arm systems having a single-piece or multiple-piece design. On the front side, the lifting arm system includes two—or pairs of—coupling elements that are positioned in the vertical direction and whose lengths may be adjusted—and which are hydraulically adjustable reciprocating cylinders in this case—that are hingedly connected at their free ends with lower linkages located in pairs on the underside.

The lower linkages are acted upon in a hinged manner on the frame structure of the tractor in a region that is located below the vehicle axis. By applying or releasing pressure to the reciprocating cylinders connected with the lifting shaft, the coupling frame and the hitch device connected thereto may be raised or lowered in the vertical direction. A special position of the coupling frame and the hitch devices attached thereto may also be adjusted by applying pressure to or releasing pressure from the reciprocating cylinders, which are located in a nearly vertical position. Given that the vertically-extending reciprocating cylinders act on the lower linkages in a central region, bending occurs in the lower linkages, the lifting shaft rotates, and pressure is applied to the arresting devices assigned to the free ends of the lower linkages, in particular when a load is introduced asymmetrically.

A design of a hitch device that does not include a lifting shaft was made known in EP 1 360 886 in order to optimize the loads that act on the hitch device, and with consideration for the fact that the application of a hitch device of this type must be highly flexible. Depending on the degrees of freedom desired, a hitch device of this type that is composed of six coupling elements includes up to six adjustable-length coupling elements, or two adjustable-length coupling elements and a large number of rigid coupling elements, via which a hitch device is supported and guided on a working vehicle, e.g., a tractor. Given that the coupling elements are located directly on the tractor or a coupling frame, or directly on the working device, only tensile and compression loads occur in the coupling elements.

The coupling elements of the hitch device located on the right and left sides are interconnected in a hydraulic manner, however, so that, when loads are introduced into the hitch device in an asymmetrical manner, as takes place, e.g., when working with a plow or when mowing using lateral mowing units, loads are applied to the coupling elements asymmetrically. To prevent damage from occurring to the coupling elements, which are typically designed as reciprocating cylinders, they must therefore be considerably oversized in design. In addition, given that the hitch device is coupled with the tractor exclusively via the coupling elements, the coupling elements must be controlled in a complicated manner so that the particular hitch device performs the desired reciprocating motion in a precise manner.

SUMMARY OF THE PRESENT INVENTION

The object of the present invention, therefore, is to avoid the described disadvantages of the related art and, in particular, to provide a hitch device that ensures that the load on the coupling elements—which form the hitch device—is balanced, even when loads are introduced asymmetrically.

In keeping with these objects and with others which will become apparent hereinafter, one feature of the present invention resides, briefly stated, in a hitch device for a working vehicle for coupling a working device to the working vehicle, that includes a lifting shaft unit supported in the frame structure of the working vehicle, and a coupling structure that is operatively connected therewith, the lifting shaft unit including a lifting shaft, at least one lifting arm that is fixedly connected with the lifting shaft, and at least one reciprocating cylinder, which is hingedly connected with the lifting arm, wherein the coupling structure includes first, upper coupling elements, which are located on the frame structure, second, lower coupling elements, which are hingedly connected to the frame structure, and connecting elements that are hingedly located on lifting arms of the lifting shaft, at least one of the connecting elements being rigid in design.

Given that the hitch device for a working vehicle for coupling a working device to the working vehicle includes a lifting shaft unit supported in the frame structure of the working vehicle and a coupling structure that is operatively connected therewith, and the coupling structure includes first, upper coupling elements that are hingedly located on the frame structure, second, lower coupling elements that are hingedly located on the frame structure, and connecting elements that are hingedly located on lifting arms of the lifting shaft—with at least one of the connecting elements being rigid in design—it is ensured that the coupling and connecting elements located on the right and left sides are coupled mechanically via the lifting shaft. As a result, when a load is introduced asymmetrically into the hitch device, a nearly balanced load distribution within the coupling structure is attained, thereby eliminating the need to oversize the coupling elements as a safeguard against asymmetrical introductions of loads.

By integrating the lifting shaft unit and at least one rigid connecting brace in the coupling structure, it is also ensured that the hitch device may be operated in a passive floating position, in which none of the adjustable-length coupling elements needs to be actively controlled. The floating position allows the coupling device to compensate for uneven ground surfaces solely via the natural weight of the working devices, without using the hydraulic circuit. When in a floating position of this type, the working device—which is preferably a ground-working device—is retained on the hitch device in a self-guiding manner solely via the action of process forces.

Great flexibility in terms of procurement costs, realizable degrees of freedom, and the use of the hitch device for highly diverse applications results when one or more of the coupling and connecting elements is/are rigid in design, and the remaining coupling elements and connecting elements are designed such that their lengths may be adjusted.

An optimized introduction of load into the coupling structure and, ultimately, into the hitch device is made possible in an advantageous embodiment of the present invention by the fact that the upper and lower coupling elements and the connecting elements of the coupling structure are located in pairs.

Given that, in an advantageous refinement of the present invention, the coupling and connecting elements are rigid in design and, by activating the at least one reciprocating cylinder of the lifting shaft unit, the working device that is adapted to the coupling structure may perform a vertical swivel motion, a cost-favorable basic configuration of the inventive hitch device is provided that is usable in a large number of general applications of the tractor.

In an advantageous refinement of the present invention, the upper coupling elements are designed such that their lengths may be adjusted, and the connecting elements and the lower coupling elements are rigid in design, so that, by activating the at least one reciprocating cylinder of the lifting shaft unit and/or the adjustable-length upper coupling elements, the working device—which is adapted to the coupling structure—is capable of carrying out a translatory motion along the vertical axis, a rotary motion around the transverse axis, and/or a controlled lateral motion composed of the rotation about a vertical axis and a superimposed translatory motion along the transverse axis. In addition to the cost-favorable use of a large number of identical parts, a design of the hitch device of this type has the advantage in particular that the hitch device is suitable in particular for coupling with working devices that require a vertical floating position, e.g., ground-working devices.

When, in a further advantageous embodiment of the present invention, the upper coupling elements and a connecting element are designed such that their lengths may be adjusted, and the further connecting element and the lower coupling elements are rigid in design, it is possible—by activating the at least one reciprocating cylinder of the lifting shaft unit and/or the adjustable-length coupling elements, and/or the adjustable-length connecting element—for the working device, which is adapted to the coupling structure—to carry out a translatory motion along a vertical axis, a rotary motion around the transverse axis, a rotary motion around the vehicle longitudinal axis, and a superimposed translatory motion along the transverse axis. In addition to easily compensating for hilly terrain, e.g., with working machines with a large working width, it is possible using a configuration of this type to greatly shorten the set-up of a plow, since controlling the adjustable-length coupling elements is easier and more comfortable as compared with conventional systems.

In a further advantageous embodiment of the present invention, the working vehicle includes articulated driving axles, which enable a "dog walk" function to be carried out, and with which one of the upper and lower coupling elements and one connecting element of the pairs of coupling and connecting elements are rigid, and the further ones are designed such that their lengths may be adjusted, and, by activating at least the adjustable-length lower and upper coupling elements and the adjustable-length connecting element, the motion of the working device that is adapted to the coupling structure may be coupled to the steering motion of the driving axles. It is therefore possible to always maintain the working device in the direction of travel of the working vehicle nearly precisely, even when working in the "dog walk" mode. In this manner, it is also ensured that the adapted working device does not collide, e.g., with the land wheels of the working vehicle. The multi-functionality of a design of this type is enhanced further in that, by activating the at least one reciprocating cylinder of the lifting shaft unit, and/or the adjustable-length upper and lower coupling elements, and the one adjustable-length connecting element, the working device that is adapted to the coupling structure may carry out a translatory motion in the vertical direction and a rotary motion around a longitudinal axis. An optimal implementation of the various courses of motion of the coupling structure is attained when, in an advantageous embodiment of the present invention, the adjustable-length coupling and connecting elements, and the rigid coupling and connecting elements are assigned to the hitch device on the right or left sides.

Similar effects are attained when, in a further advantageous embodiment of the present invention, the working vehicle also includes articulated driving axles, which enable a "dog walk" function to be carried out, and with which the upper and one of the lower coupling elements and one connecting element of the paired coupling and connecting elements are designed such that their lengths may be adjusted, and the remaining coupling and connecting elements are rigid in design, and, by activating the adjustable-length coupling elements and the adjustable-length connecting element, the motion of the working device that is adapted to the coupling structure may be coupled to the steering motion of the driving axles. In addition, with a structure of the hitch device of this type, it is possible, by activating the at least one reciprocating cylinder and/or the adjustable-length coupling elements and the adjustable-length connecting element of the coupling structure, for the working device that is adapted to the coupling structure to carry out a translatory motion in the vertical direction, a rotary motion around the transverse axis, a rotary motion around a longitudinal axis, and/or a controlled lateral motion. In addition to the effects described above, the number of realizable degrees of freedom of the motion of the hitch device is therefore increased further.

The greatest number of degrees of freedom in the motion of the hitch device results, in an advantageous refinement of the present invention, when the upper and lower coupling elements and one connecting element are designed such that their lengths may be adjusted, and the further connecting element is rigid in design, and, by activating the at least one reciprocating cylinder of the lifting shaft unit and the adjustable-length coupling and connecting elements, the working device that is adapted to the coupling structure carries out translatory motions along—and rotary motions around—an axis of motion that is oriented in the vehicle longitudinal direction, transversely to the vehicle longitudinal direction, and in the vertical direction.

In an advantageous embodiment of the present invention, the translatory motion may be carried out in and opposite to an axis of motion that is oriented in the vehicle longitudinal direction in order to compensate for oscillations between the working vehicle and the adapted working device. This is very interesting, in particular, when the working device is a piston press, and the motion of the coupling structure in and opposite to the vehicle longitudinal direction is carried out to compensate for vibrations of the working vehicle that are caused by the piston press.

In an advantageous refinement of the present invention, the length of the adjustable-length coupling elements and connecting elements may be adjusted hydraulically, mechanically, and/or electrically. In this context, it is also advantageous when the rigid coupling element(s) or the at least one rigid connecting element include means for manually changing their length. In this manner it is possible to tailor the basic dimensions of the coupling structure and, therefore, the hitch device, to the particular application.

Low reaction forces in the lifting shaft support are also ensured by the fact that the bearing of the lifting shaft on the frame structure of the working vehicle and the bearing of the lower coupling elements on the frame structure of the working vehicle are located close to each other.

The universal usability of the hitch device is also increased by the fact that the free ends of the coupling elements and connecting elements facing away from the working vehicle are directly adaptable to the particular working device or a coupling frame. A rapid adaptation of the working device to the hitch device is also supported when the coupling frame is designed essentially as a type of single-phase coupler, and the particular free end of the coupling and connecting elements located on the working-device side are attached thereto. A technically proven design of the coupling points results when the articulation points—on the working-device side—of the upper and lower coupling elements and the connecting elements are designed as coupling hooks, and, together with the corresponding articulation points of the working device or a coupling frame, form a hinged connection.

In an advantageous refinement of the present invention, the working-vehicle side articulation points of the pairs of lower and upper coupling elements and the connecting elements are separated from each other, thereby making it possible to position at least one power take-off transmission and/or a pulling device between them.

In a further advantageous embodiment of the present invention, the working-vehicle side and the working-device side articulation points of the coupling elements and the connecting elements including bearing points with two or three degrees of freedom. In a preferred embodiment, these may be designed as ball joints. The number of coupling points required may also be reduced when one coupling element and one connecting element in each case have—on the working-vehicle side and/or the working-device side—a common articulated point that is designed as a ball joint.

Given that the coupling structure includes at least one rigid connecting element, it is also ensured that the hitch device may be operated in a passive floating position.

A lateral pendulum motion of the inventive hitch device may be initiated precisely and rapidly when, in an advantageous refinement, the paired upper coupling elements are designed as dual-action, reciprocating cylinders, and the pressure chambers—located on the piston-rod side and the piston-surface side—of the reciprocating cylinders are interconnected so that the hydraulic medium may be exchanged.

A reduction in the torque that acts on the lifting shaft decreases when the same load is introduced and as the distance between the vehicle-side articulation points of the lower coupling elements of the coupling structure decreases. It is therefore advantageous when the working-vehicle side articulation points of the lower coupling elements are separated by an adjustable, horizontal expansion distance.

In an advantageous refinement of the present invention, the hitch device may be located on the front and/or back side(s), depending on the application.

In an advantageous embodiment of the present invention, the coupling structure defines the horizontal and vertical instantaneous centers, the position of the instantaneous centers being adjustable, thereby enabling the courses of motion and the trajectories of motion followed by the coupling structure to be adapted in a highly variable manner to highly diverse conditions of use.

In addition, the inventive hitch device is designed such that the motion of the coupling structure in the vertical direction (34, 38) is brought about solely by pressure acting on or being released from the reciprocating cylinder that actuates the lifting shaft unit. In this manner it is ensured that, even in the technically simplest design, the coupling structure at least allows an adapted hitch device to be raised and lowered.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a perspective illustration of a first structure of the hitch device

DESCRIPTION OF THE PREFERRED EMBODIMENTS

Figure 2A:
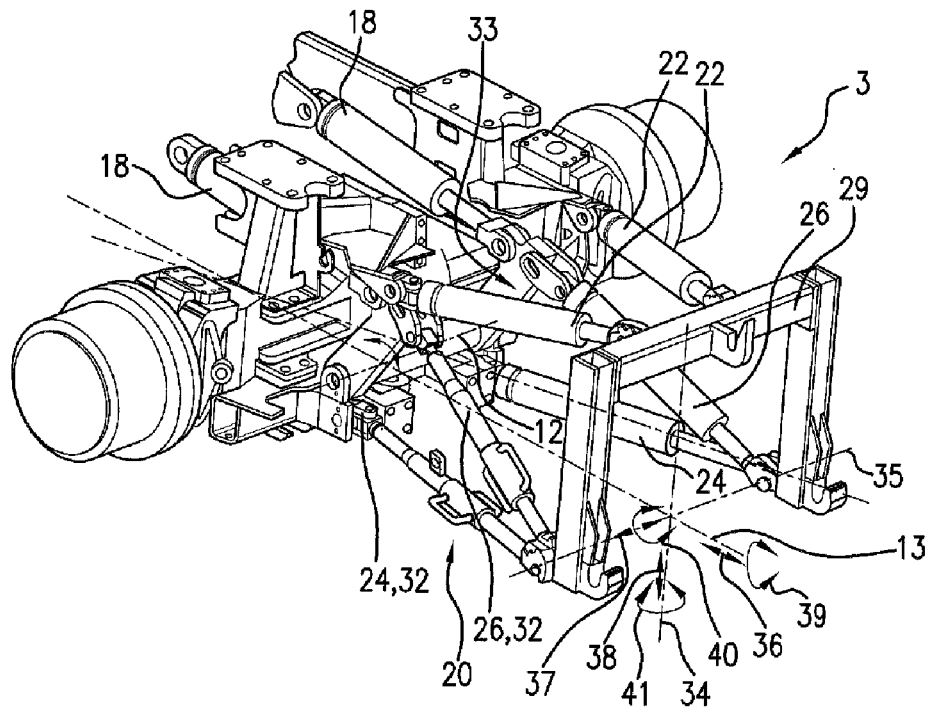
FIG. 2 shows a perspective illustration of a further structure of the hitch device with working vehicles with a "dog walk" function

FIG. 1 shows a working vehicle 1 designed as a tractor 2, to which hitch device 3—which will be described in greater detail—is assigned, at the rear. It is within the scope of the present invention for hitch device 3, 3' to be assigned to the front of tractor 2, as an alternative or in addition thereto. In a known manner, tractor 2 includes a front axle 6 with land wheels 4, 5, and a rear axle 7. In the exemplary embodiment shown, rear axle 7 is accommodated by a frame structure 8, which is assigned to working vehicle 1 that is designed as a tractor 2. In a region assigned to rear axle 7 on the underside, bearing flanges 9 are integrally formed with frame structure 8, which accommodate bearing seats 10 of a lifting shaft 11 in a manner such that rotation axis 12 of lifting shaft 11 extends nearly perpendicularly to vehicle longitudinal axis 13 of tractor 2.

Lifting arms 14 are integrally formed with lifting shaft 11 in the region of bearing seats 10, with which supporting flanges 15 are integrally formed in their top-side region assigned to rear axle 7, with which piston rod-side ends 16 of reciprocating cylinders 18 engage in a pivoting manner, piston rod-side ends 16 being accommodated by frame structure 8 on the cylinder side 17 in a pivoting manner. By applying pressure to or releasing pressure from reciprocating cylinders 18, lifting arms 14 and, therefore, the lifting shaft are swiveled around rotational axis 12 of lifting shaft 11 in arrow direction 19.

To articulate coupling structure 20, which will be described in greater detail, supporting flanges 21 are integrally formed with frame structure 8 of tractor 2 in a top-side region at the same horizontal level in order to accommodate—in a pivotable manner—first, paired, upper coupling elements 22. Supporting flanges 23 are integrally formed with frame structure 8 of tractor 2 in an underside region, which is preferably located in the region of bearing flange 9 of lifting shaft 11, at the same horizontal level in order to accommodate—in a pivotable manner—second, paired, lower coupling elements 24. Lifting arms 14 of lifting shaft 11 also include—in a top-side region facing away from rear axle 7—further supporting flanges 25, which accommodate paired connecting elements 26 in a pivoting manner. Articulation points 27—which will be described in greater detail below—are located on the free ends—facing away from rear axle 7—of upper coupling elements 22, lower coupling elements 24, and connecting elements 26, the articulation points 27 being connectable in a pivoting manner with coupling points 28 of a coupling frame 29, or directly with coupling points 30 of a working device 31 to be adapted to working vehicle 1, e.g., a plow.

For simplicity, further aspects of the present invention will be described with reference to an embodiment with coupling frame 29, even though the interrelationships described apply similarly for hitch devices 3 that are directly connected to particular working device 31 without the use of a coupling frame 29. FIG. 1 shows the design of coupling structure 20, with which hitch device 3 may be operated with six degrees of freedom. To this end, it is necessary for the upper and lower coupling segments 22, 24 and one of the connecting elements 26 that connects lifting shaft 11 with coupling frame 29 to be designed such that their lengths are adjustable, i.e., as hydraulic cylinders in the simplest case. According to the present invention, the further one of the paired connecting elements 26 is designed as a rigid connecting brace 32.

By either applying pressure to or releasing pressure from—separately or in a coordinated manner—reciprocating cylinders 18 that actuate lifting shaft unit 33, or adjustable-length, upper and lower coupling elements 22, 24, and adjustable-length connecting brace 26, it is possible for coupling frame 29—and, therefore, working device 31 adapted thereto—to carry out translatory motions (arrow directions 36 through 38) along—and rotary motions (arrow directions 39 through 41) around—an axis of motion that is oriented in vehicle longitudinal direction 13, transversely to vehicle longitudinal direction 35, and in vertical direction 34. In addition to the completely free motion of coupling frame 29 in three dimensions, translatory motion 36, e.g., of coupling frame 29 along vehicle longitudinal axis 13 may be used to compensate for vibrations between adapted working device 31 and working vehicle 1. An application of this type is helpful, in particular, when adapted working device 31 is designed as a piston press—which is not shown but which is known per se—whose circumferential plunger—which performs a working stroke and a return stroke—introduces considerable vibrations into working vehicle 1 when conventional hitch devices 3 are used.

Given that one of the connecting elements 26 is designed as a rigid connecting brace 32, coupling structure 20 is also designed such that hitch device 3 may be operated in a passive floating position, in which a working device that has been adapted to hitch device 3 may glide over the ground without any need to actively control adjustable-length coupling and connecting elements 22, 24, 26.

Figure 2B:
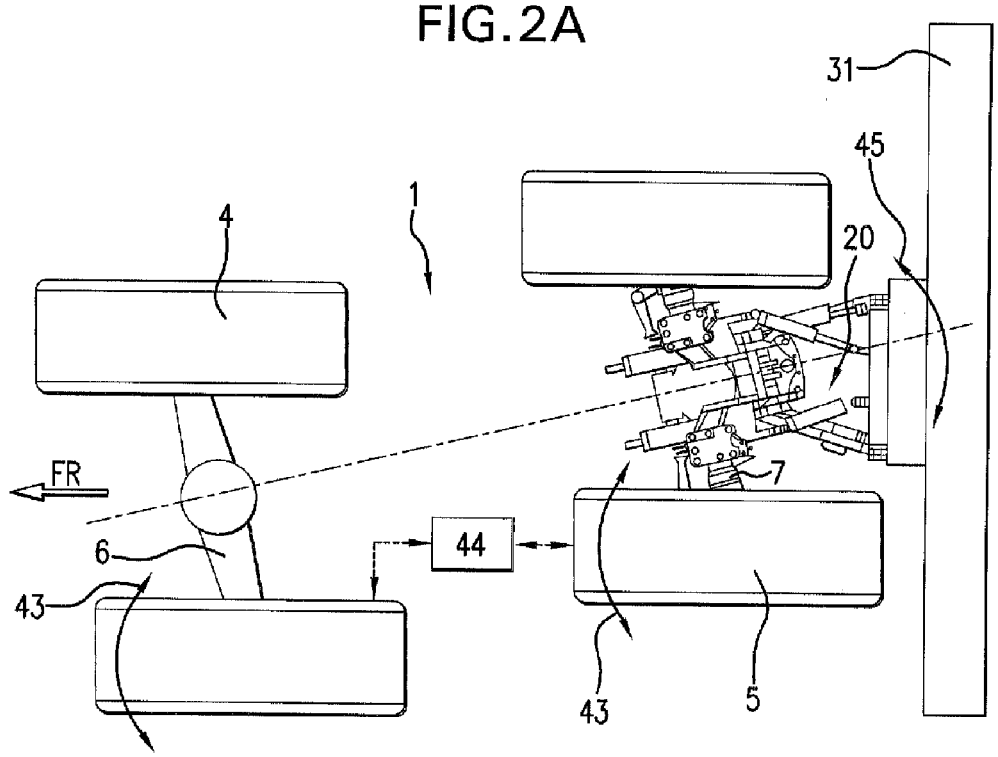

In a further embodiment of the present invention as shown in FIG. 2, working vehicle 1 is capable of performing a "dog walk" function. This means that land wheels 4, 5 of front and rear axles 6, 7 may be controlled individually or in an axle-wise manner. It is therefore possible for working vehicle 1 to be driven over ground 42 such that each land wheel 4, 5 runs along a separate track, which minimizes damage to the ground that results when it is rolled over repeatedly. In this variant of the embodiment, inventive coupling structure 20 of hitch device 3 includes adjustable-length, upper coupling elements 22, an adjustable-length, lower coupling element 24, and an adjustable-length connecting brace 26 of paired coupling elements 22, 24 and connecting braces 26. In the simplest case, the length may be adjusted via reciprocating cylinders. Remaining connecting brace 26 and one of the lower coupling elements 24 are designed as rigid connecting brace 32.

By applying pressure to or releasing pressure from adjustable-length coupling elements 22, 24 designed as reciprocating cylinders, and one connecting element 26, it is possible to couple the motion of coupling frame 29 and working device 31 adapted thereto to steering motion 43 of land wheels 4, 5, thereby ensuring that the orientation of working device 31 relative to the orientation of land wheels 4, 5 and, therefore, to direction of travel FR of working vehicle 1, remain nearly unchanged. In a preferred embodiment, the steering angle of land wheels 4, 5 described by steering motion 43 is measured and converted in an evaluation unit 44 into a pivot motion 45 of coupling structure 20. Finally, pressure is applied to or released from adjustable-length coupling elements 22, 24 and adjustable-length connecting element 26 in a manner such that coupling structure 20 carries out pivot motion 45 that has been ascertained.

By applying pressure to or releasing pressure from—separately or in a coordinated manner—reciprocating cylinders 18 that actuate lifting shaft unit 33, or to/from adjustable-length, upper and lower coupling elements 22, 24, and one adjustable-length connecting brace 26, it is possible for coupling frame 29, and therefore, working device 31 adapted thereto, to carry out a translatory motion 38 in vertical direction 34, a rotary motion 40 around transverse axis 35, a rotary motion 39 around a longitudinal axis 13, and/or a controlled lateral motion composed of rotation 41 about a vertical pivot axis 34 and a translatory motion 37 along transverse axis 35. With a design of this type, coupling frame 29 does not perform a translatory motion along vehicle longitudinal axis 13.

The "dog walk" function of working vehicle 1 may be added subsequently to working device 31 when, e.g., for reasons of cost, only one of the pairs of upper and lower coupling elements 22, 24 and connecting braces 26 is designed such that its length may be adjusted, and adjustable-length coupling elements 22, 24 and adjustable-length connecting element 26 are assigned to hitch device 3 and, therefore to coupling structure 20, on either the left or right side. The number of possible degrees of freedom is reduced in this case, however. In the present case, there is no rotary motion around transverse axis 35, nor is there a lateral pendulum motion due to blocked rotary motion 41 around vertical pivot axis 34.

Figure 3:
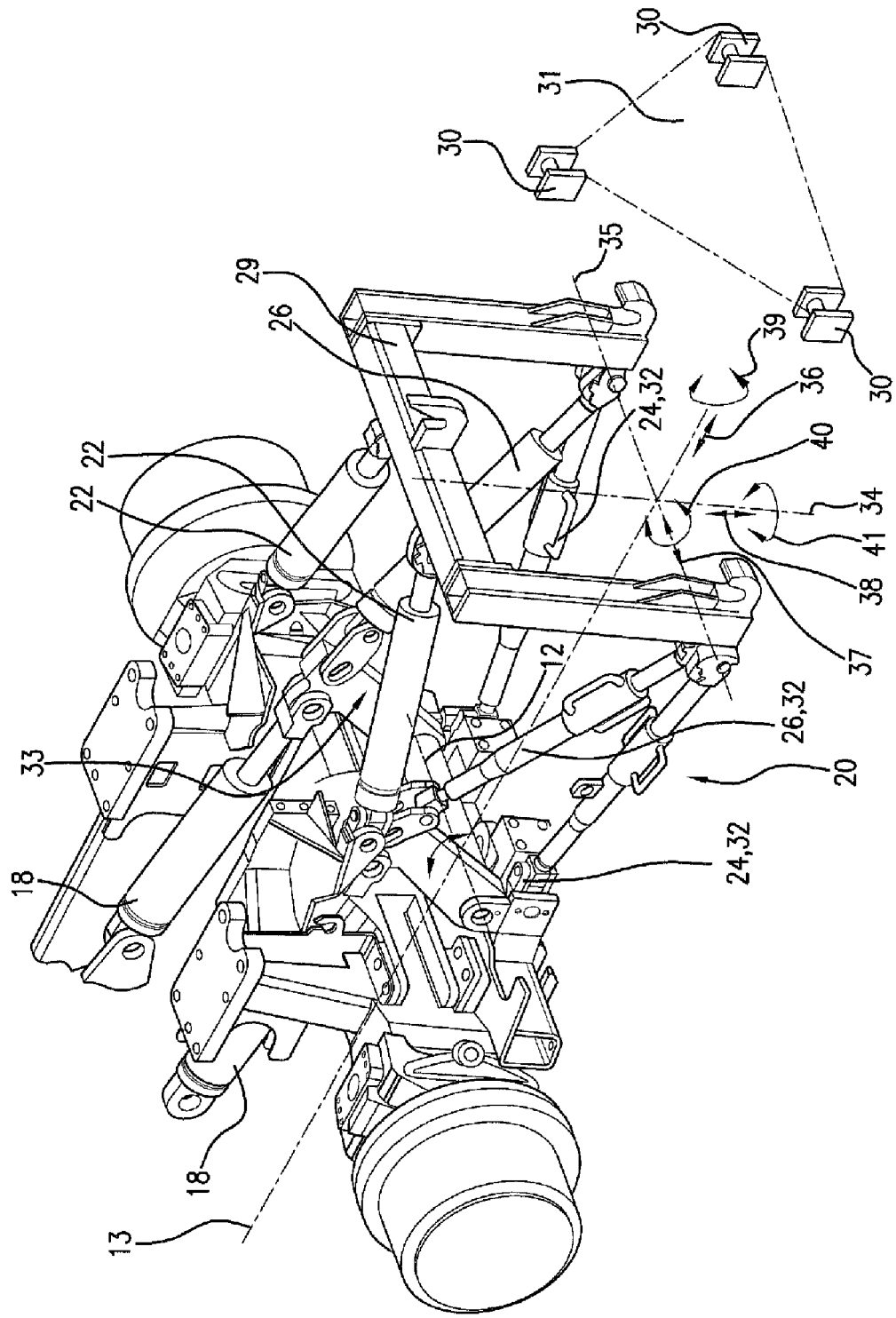
FIG. 3 shows a perspective illustration of a further structure of the hitch device

In a further embodiment of the present invention as shown in FIG. 3, upper coupling elements 22 and a connecting element 26 are designed such that their lengths may be adjusted, and further connecting element 26 and lower coupling elements 24 are designed as rigid connecting braces 32. By activating reciprocating cylinders 18 of lifting shaft unit 33, and/or adjustable-length coupling elements 22, and/or adjustable-length connecting element 26, it is possible for working device 31 that is adapted to coupling structure 20 to carry out a translatory motion 38 along a vertical axis 34, a rotary motion 40 around transverse axis 35, a rotary motion 39 around vehicle longitudinal axis 13, and/or a controlled lateral motion, i.e., rotation 41 about a vertical pivot axis 34, and a superimposed translatory motion 37 along transverse axis 35.

Figure 4:
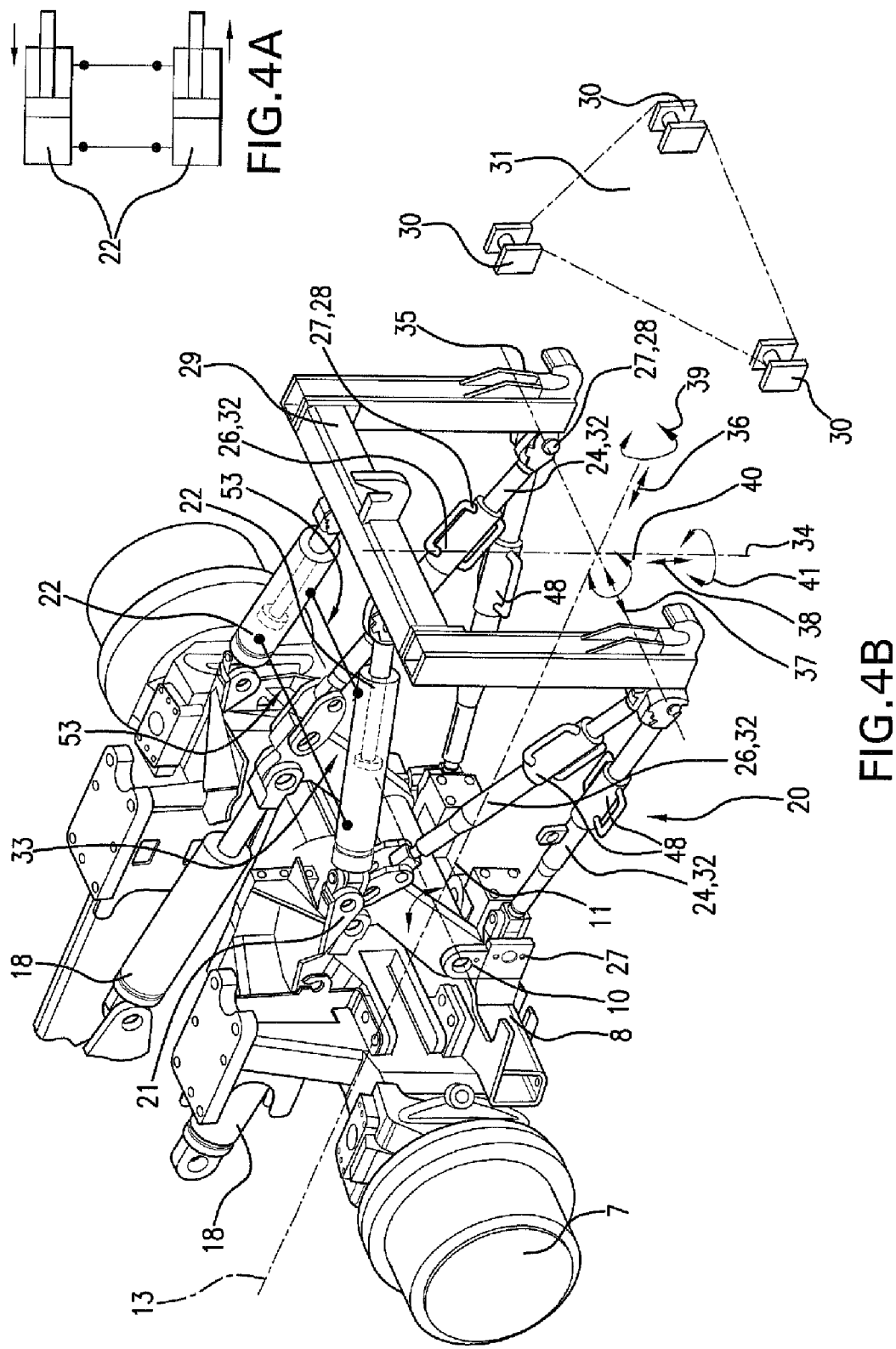
FIG. 4 shows a perspective illustration of a further structure of the hitch device

Given that, in FIG. 4, upper coupling elements 22 are designed such that their lengths may be adjusted, and connecting elements 26 and lower coupling elements 24 are designed as rigid coupling braces 32, the costs to manufacture coupling structure 20 and, therefore, hitch device 3, are reduced further. The number of degrees of freedom are further reduced with a structure of hitch device 3 of this type. By activating reciprocating cylinders 18 of lifting shaft unit 33, and/or adjustable-length, upper coupling elements 22, working device 31 that is adapted to coupling structure 20 carries out a translatory motion 38 along vertical pivot axis 34, a rotary motion 40 around transverse axis 35, and/or a controlled lateral motion, which is composed—as described above—of rotation 41 about a vertical axis 34 and a superimposed translatory motion 37 along transverse axis 35.

Figure 5:
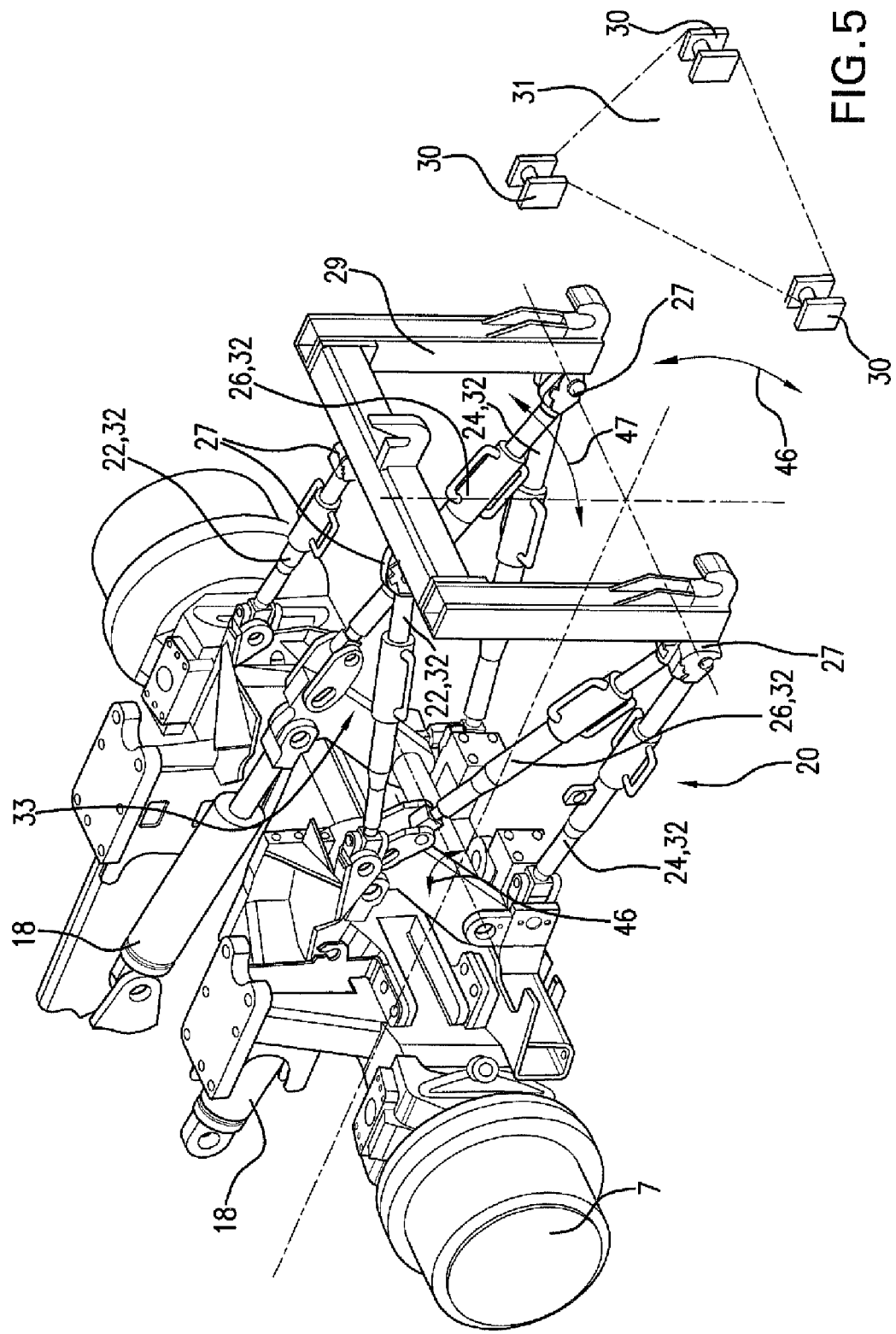
FIG. 5 shows a perspective illustration of the hitch device exclusively with rigid coupling elements

Given that—as shown in FIG. 5—upper coupling elements 22 are designed as rigid connecting braces 32, a coupling structure 20 results that is composed exclusively of rigid connecting braces 32. With a structure of this type, an exclusive vertical pivot motion of hitch device 3 in arrow direction 46 may be realized by applying pressure to or releasing pressure from reciprocating cylinders 18 that are coupled with lifting shaft unit 33. A lateral pendulum motion of hitch device 3 in arrow direction 47 depends on the bearing play in various articulation points 27 and may not be influenced in a specific manner.

It is also within the framework of the present invention for the adjustable-length lower and upper coupling elements 22, 24 and adjustable-length connecting element 26 to be adjustable in terms of length in a hydraulic, mechanical, or electrical manner. In addition, rigid connecting braces 32 shown in FIG. 4 may include means for manually changing the length of particular connecting brace 32, e.g., a threaded spindle system. Regardless of whether particular coupling and connecting elements 22, 24, 26 are designed such that they are rigid or that their lengths may be adjusted, a load-optimized design of hitch device 3 results when vehicle-side articulation points 27 of lower coupling elements 24 are positioned on frame structure 8 such that they are close to bearing seats 10 of lifting shaft 4 on frame structure 8.

Figure 6:
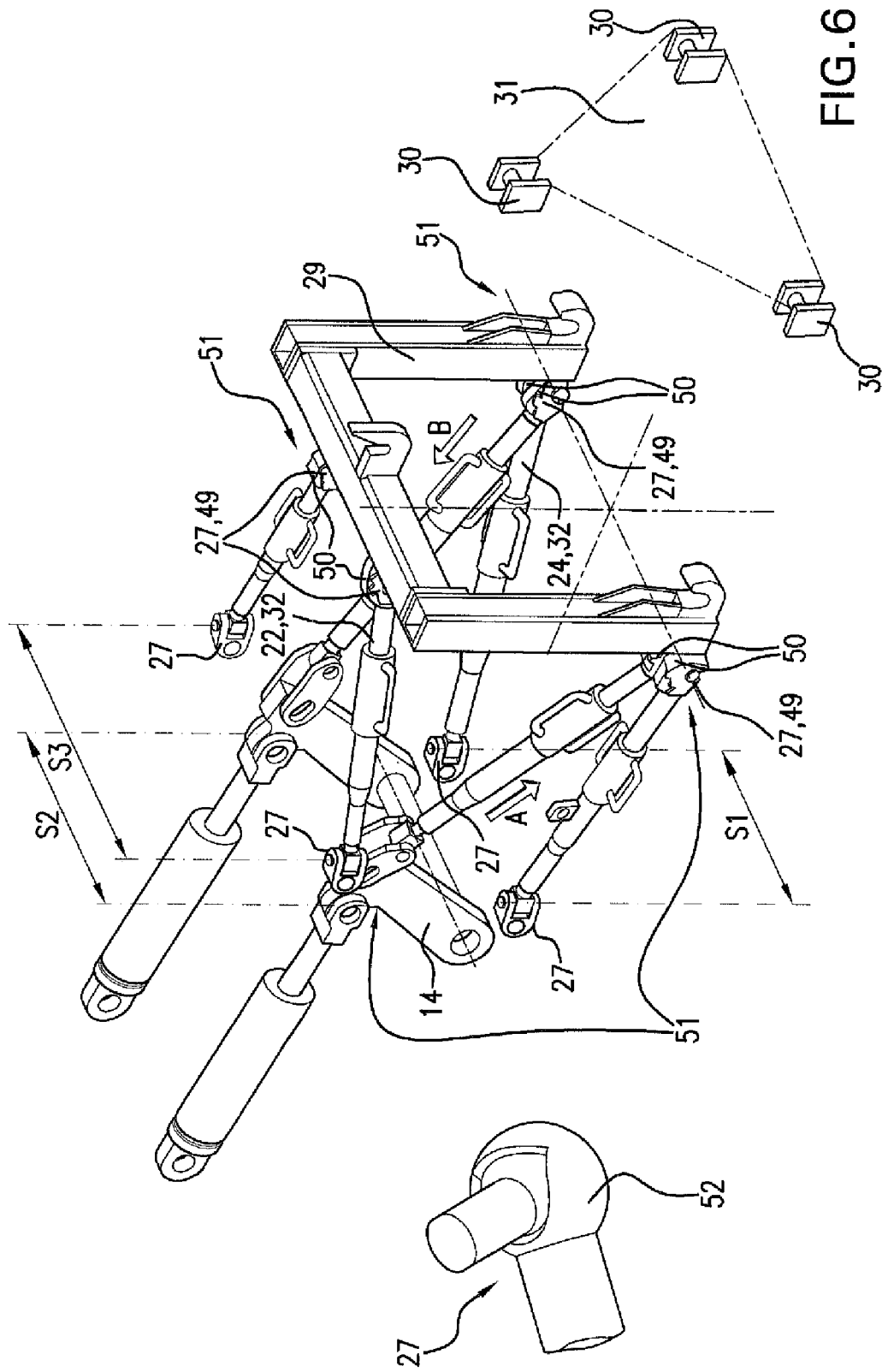
FIG. 6 shows a perspective illustration of a detail of the hitch device

According to FIG. 6, coupling frame 29 may be designed as a single-phase coupler. Articulation points 27 assigned to coupling frame 29 are designed as peg-shaped segments 49. The free ends—located on the coupling-frame side—of coupling elements 22, 24 and connecting elements 26 accommodate self-closing coupling hooks 50, which may snap into peg-shaped segments 49 of coupling frame 29 in a self-closing manner. Coupling frame 29 includes—on the working-device side—receiving hooks, which may ultimately be brought into engagement with corresponding coupling points 30 of working device 31. It is within the scope of the present invention for coupling and connecting elements 22, 24, 26 to also be located directly on a working device 31 without a coupling frame 29 between them. In addition, articulation points 21—on the working-device side—of the pairs of lower and upper coupling elements 22, 24, and connecting elements 26 are separated by a distance S1 through S3, which makes it possible to position at least one not-shown power take-off transmission and/or a pulling device between them.

Distance S1—which is also referred to as the expansion distance—between articulation points 27 of lower coupling elements 24 may also be adjustable, thereby making it possible to further optimize the loads that act on hitch device 3. Bearing points 51 with two or three degrees of freedom may be created, depending on the state of the bearings—which are positioned in working vehicle-side and working device-side articulation points 27—of coupling elements 22, 24 and connecting elements 26. It is within the scope of the present invention for articulation points 27 to be designed as ball joints 52, and for articulation points 27 of various coupling and connecting elements 22, 24, 26 to be combined into a single ball joint 52.

If, as shown in FIG. 4, paired, upper coupling elements 22 are designed as reciprocating cylinders, the horizontal pendulum motion of hitch device 3 and, therefore, that of the working device may be realized in a simple manner by connecting the piston-rod side and piston-surface side pressure chambers of the reciprocating cylinders such that they may exchange hydraulic medium via line systems and related switching valves 53.

In a manner known per se, coupling elements 22, 24, which are integrated in coupling structure 20 in a pivotable manner, form a horizontal and vertical instantaneous center M1, M2, respectively, for pivoting coupling structure 20 in a horizontal and vertical plane, as shown in FIG. 1, it being possible to change the horizontal and vertical instantaneous center M1, M2 depending on the adjustable geometry of the coupling structure.

It will be understood that each of the elements described above, or two or more together, may also find a useful application in other types of constructions differing from the types described above.

While the invention has been illustrated and described as embodied in a hitch device for a working vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A hitch device for a working vehicle for coupling a working device to the working vehicle, comprising
    a lifting shaft unit supportable in a frame structure of the working vehicle, the lifting shaft unit including a lifting shaft, at least one lifting arm that is fixedly connected with the lifting shaft, and at least one reciprocating cylinder, which is hingedly connected with the lifting arm; and
    a coupling structure that is operatively connected with the lifting shaft unit, the coupling structure including first, upper coupling elements, which are locatable on the frame structure, second, lower coupling elements, which are hingedly connectable to the frame structure and connecting elements that are hingedly located on lifting arms of the lifting shaft and coupled to the frame structure,
    wherein at least one of the connecting elements comprises a rigid connecting brace that is fixed in length and wherein the upper and lower coupling elements, and the connecting elements of the coupling structure are located in pairs.

2. The hitching device for a working vehicle as recited in claim 1, wherein one or more of the coupling elements and connecting elements are rigid, and the remaining coupling elements and connecting elements are configured such that their lengths are adjustable.

3. The hitch device for a working vehicle as recited in claim 1, wherein the coupling and connecting elements are rigid, and, by activating the at least one reciprocating cylinder of the lifting shaft unit, the working device that is adapted to the coupling structure carries out a vertical pivot motion.

4. The hitch device for a working vehicle as recited in claim 1, wherein the upper coupling elements are configured such that their lengths are adjustable, and the connecting elements and the lower coupling elements are rigid, and, by activating the at least one reciprocating cylinder of the lifting shaft unit and/or the adjustable-length, upper coupling elements, the working device that is adapted to the coupling structure carries out a translatory motion in a direction of a vertical pivot axis, a rotary motion around a transverse axis or a controlled lateral motion composed of a rotation about the vertical pivot axis, and a superimposed translatory motion along the transverse axis.

5. The hitch device for a working vehicle as recited in claim 1, wherein the upper coupling elements and one connecting element are configured such that their lengths may be adjusted, and a further connecting element and the lower coupling elements are rigid, and, by activating the at least one reciprocating cylinder of the lifting shaft unit and/or the adjustable-length coupling elements, and/or the adjustable-length connecting element, the working device that is adapted to the coupling structure carries out a translatory motion along a vertical axis, a rotary motion around a transverse axis, a rotary motion around a vehicle longitudinal axis or a controlled lateral motion composed of a rotation about a vertical pivot axis, and a superimposed translatory motion along the transverse axis.

6. The hitch device for a working vehicle as recited in claim 1, wherein the working vehicle includes articulated driving axles, which enable a "dog walk" function to be carried out, and with which one of the upper and lower coupling elements and one connecting element of a paired coupling and connecting elements are rigid, and further ones are configured such that their lengths are adjustable, and, by activating at least the adjustable-length lower and upper coupling elements and the adjustable-length connecting element, a motion of the working device that is adapted to the coupling structure may be coupled to a steering motion of driving axles.

7. The hitch device for a working vehicle as recited in claim 6, wherein, by activating the at least one reciprocating cylinder of the lifting shaft unit or the adjustable-length upper and lower coupling elements, and the one adjustable-length connecting element, the working device that is adapted to the coupling structure carries out a translatory motion in a vertical direction and a rotary motion around a vehicle longitudinal axis.

8. The hitching device for a working vehicle as recited in claim 6, wherein the adjustable-length coupling and connecting elements and the rigid coupling and connecting elements are assigned to a right or left side of the hitch device.

9. The hitch device for a working vehicle as recited in claim 1, wherein the working vehicle includes articulated driving axles, which enable a "dog walk" function to be carried out, and with which the upper and one of the lower coupling elements and one connecting element of a paired coupling elements and connecting elements are configured such that their lengths are adjustable, and remaining coupling and connecting elements are rigid, and, by activating the adjustable-length coupling elements and the adjustable-length connecting element, the motion of the working device that is adapted to the coupling structure may be coupled to the steering motion of the driving axles.

10. The hitch device for a working vehicle as recited in claim 9, wherein, by activating the at least one reciprocating cylinder of the lifting shaft unit or the adjustable-length coupling elements, and the adjustable-length connecting element of the coupling structure, the working device that is adapted to the coupling structure carries out a translatory motion in a vertical direction, a rotary motion around a transverse axis, a rotary motion around a vehicle longitudinal axis, and/or a controlled lateral motion composed of a rotation about a vertical axis and a superimposed translatory motion along the transverse axis.

11. The hitch device for a working vehicle as recited in claim 1, wherein the upper and lower coupling elements and one connecting element are configured such that their lengths are adjustable, and a further connecting element is rigid, and, by activating the at least one reciprocating cylinder of the lifting shaft unit and the adjustable-length coupling elements and the adjustable-length connecting element, the working device that is adapted to the coupling structure carries out translatory motions along axes of motion, and rotary motions around the axes of motion, which axes of motion are oriented in a vehicle longitudinal direction, transversely to the vehicle longitudinal direction, and in a vertical direction.

12. The hitch device for a working vehicle as recited in claim 11, wherein the translatory motion is carried out in and opposite to an axis of motion oriented in a vehicle longitudinal direction, in order to compensate for vibrations between the working vehicle and the adapted working vehicle.

13. The hitch device for a working vehicle as recited in claim 12, wherein the working device is a piston press, and the relative motion of the coupling structure in and opposite to the vehicle longitudinal direction is carried out to compensate for vibrations of the working vehicle that are caused by the piston press.

14. The hitch device for a working vehicle as recited claim 4, wherein the length of the adjustable-length coupling and connecting elements is changed in a manner selected from the group consisting of hydraulically, mechanically, electrically, and combinations thereof.

15. The hitching device for a working vehicle as recited in claim 14, wherein at least one rigid coupling element or a rigid connecting brace includes means for changing a length manually.

16. The hitching device for a working vehicle as recited in claim 1, wherein a bearing of the lifting shaft on the frame structure of the working vehicle and a bearing of the lower coupling elements on the frame structure of the working vehicle are located close to each other.

17. The hitch device for a working vehicle as recited in claim 1, wherein the free ends of the coupling and connecting elements facing away from the working vehicle are adapted directly to a particular working device or a coupling frame.

18. The hitch device for a working vehicle as recited in claim 17, wherein the coupling frame is configured essentially as a type of single-phase coupler, and a particular free end of the coupling and connecting elements located on a working-device side are attached thereto.

19. The hitch device for a working vehicle as recited in claim 1, wherein articulation points—on a working-device side—of the upper and lower coupling elements and the connecting elements are designed as coupling hooks, and, together with corresponding articulation points of the working device or a coupling frame, form a hinged connection.

20. The hitch device for a working vehicle as recited in claim 1, wherein articulation points on a working-device side, pairs of lower and upper coupling elements and the connecting elements are separated by a distance, which makes it possible to position at least one power take-off transmission or a pulling device between them.

21. The hitch device for a working vehicle as recited in claim 1, wherein articulation points of the coupling and connecting elements located on a working-vehicle side and on a working-device side contain bearing points with two or three degrees of freedom.

22. The hitching device for a working vehicle as recited in claim 1, wherein one coupling element and one connecting element include, on a working-vehicle side or a working-device side, a common articulated point designed as a ball joint.

23. The hitch device for a working vehicle as recited in claim 1, wherein the coupling structure is operatable in a passive floating position using the lifting shaft.

24. The hitch device for a working vehicle as recited in claim 1, wherein paired upper coupling elements are configured as dual-action, reciprocating cylinders, and pressure chambers—located on a piston-rod side and a piston-surface side—of the reciprocating cylinders are interconnected so that a hydraulic medium may be exchanged.

25. The hitch device for a working vehicle as recited in claim 1, wherein articulation points—on a working-vehicle side—of the lower coupling elements have an adjustable horizontal expansion distance between them.

26. The hitch device for a working vehicle as recited in claim 1, wherein the hitch device is assigned to the working vehicle at a front or the rear.

27. The hitch device for a working vehicle as recited in claim 1, wherein the coupling structure forms horizontal and vertical instantaneous center depending on a spacial position of the coupling elements, the position of the instantaneous center being adjustable.

28. The hitch device for a working vehicle as recited in claim 1, wherein a motion of the coupling structure in a vertical direction is brought about solely by applying pressure to or releasing from the reciprocating cylinder that actuates the lifting shaft unit.

* * * * *